US006059433A

United States Patent [19]

Otaka et al.

[11] Patent Number: 6,059,433

[45] Date of Patent: May 9, 2000

[54] VEHICLE LAMP

[75] Inventors: Nobuo Otaka; Kaneki Hirano, both of Shizuoka, Japan

[73] Assignee: Koito Manufacturing Co., Ltd., Tokyo, Japan

[21] Appl. No.: 09/081,077

[22] Filed: May 19, 1998

[30] Foreign Application Priority Data

May 20, 1997 [JP] Japan .................................... 9-129278

[51] Int. Cl.[7] ........................................ B60Q 1/02

[52] U.S. Cl. .......................... 362/507; 362/506; 362/516; 362/226

[58] Field of Search .................................... 362/506, 516, 362/519, 546, 548, 226, 507, 518, 547, 487, 459

[56] References Cited

U.S. PATENT DOCUMENTS

| | | | |
|---|---|---|---|
| 1,702,746 | 2/1929 | Prichard | 362/518 |
| 4,480,296 | 10/1984 | Gagnon et al. | 362/519 |
| 5,567,033 | 10/1996 | Tanska et al. | 362/346 |
| 5,584,559 | 12/1996 | Toda | 362/548 |
| 5,609,407 | 3/1997 | Yanagihara et al. | 362/547 |
| 5,746,491 | 5/1998 | Tatsukawa | 362/310 |
| 5,816,680 | 10/1998 | Sato | 362/346 |
| 5,944,415 | 8/1999 | Kurita et al. | 362/518 |

FOREIGN PATENT DOCUMENTS

| | | | |
|---|---|---|---|
| 2607577 | 6/1988 | France | 362/546 |

*Primary Examiner*—Cassandra Spyrou
*Assistant Examiner*—John Juba, Jr.
*Attorney, Agent, or Firm*—Morgan, Lewis & Bockius LLP

[57] ABSTRACT

A bulb inserting hole is bored in a position deviating from the center of a reflector which is held tightly to the interior of a lamp body, and the reflector is held tightly in its central portion by a screw to the lamp body. The reflector can be held tightly in a well-balanced fashion by one screw with the effect of not only improving the light reflective efficiency of a lamp by decreasing the area required for the provision of the screw but also simplifying the work of fixing the reflector. Moreover, the screw is hidden by a bulb mounted in the reflector through the bulb inserting hole and set free from exposure to the front side of the lamp, so that the neatness of the external appearance of the lamp is improved.

14 Claims, 4 Drawing Sheets

VEHICLE LAMP

BACKGROUND OF THE INVENTION

1. Field of the Invention

The present invention relates to a vehicle lamp having a reflector and shield plates which are separately mounted in a lamp body.

2. Related Art

There has been proposed a lamp employed for a vehicle such as an automobile, the lamp being made up through the steps of forming a reflector by bending a metal plate into a separate body, mounting and holding the separate body tightly to the interior of a lamp body formed by resin molding. In the lamp like this, a bulb inserting hole for use in inserting a light bulb as a light source opens in the substantially central position of the back of the reflector. Consequently, places near the bulb inserting hole or normally on both lateral sides of the bulb inserting hole are so structured that the reflector is held tightly to the interior of the lamp body by means of screws in order to have the reflector well-balanced. In the lamp of this sort, namely, in the case of a flat lamp having a small vertical dimension, heat shield plates for respectively covering the upper and lower interior portions of the lamp body are held tightly to the interior of the lamp body to prevent the interior portions from being damaged by overheating resulting from the heat generated by the bulb; in other words, the heat shield plates are used to prevent the upper and lower interior portions of the lamp body from being overheated by shielding the heat generated by the bulb.

Since the fixing screw is positioned in both places of the bulb inserting hole in an effective reflective surface area of the vehicle lamp thus structured, there develops problems including lowering light reflective efficiency in this area, thus resulting in lowering the irradiation luminance of the lamp, and deteriorating the neatness of the external appearance of the lamp when the lamp is looked at through the front lenses because the screws can be seen therethrough. In addition, the problem in this case is that workability is low because the work of tightening a plurality of screws as the work of fixing the reflector is required. In the aforesaid lamp furnished with the heat shield plates together with the reflector in the lamp body, further, there also exists a problem arising from not only an increase in the number of components constituting the lamp since the heat shield plates are formed separately from the reflector and held tightly to the interior of the lamp body but also poorer workability as long as the whole lamp assembly work is concerned because the work of fixing the heat shield plates, independent of the reflector, to the lamp body by means of the screws or the like is required.

SUMMARY OF THE INVENTION

An object of the present invention is to provide a vehicle lamp whose reflector offers improved light reflective efficiency and which effects improvement in the neatness of external appearance. Another object of the present invention is to provide a vehicle lamp capable of improving lamp assembly workability.

A vehicle lamp according to the present invention comprises a lamp body, a reflector formed separately from the lamp body and held tightly to the interior of the lamp body, lenses fitted into the front opening of the lamp body in order to form a lamp chamber, and a bulb fitted into the lamp body from behind and disposed in the lamp chamber, and is characterized in that a bulb inserting hole is bored in a position deviating from the center of the reflector and that the reflector is held tightly to the interior of the lamp body by the use of fixing means positioned in the central portion of the reflector. The reflector is tightly held by the fixing means in a well-balanced way, and the fixing means is kept from sight when the lamp is looked at from the front side of the lamp because it is prevented from coming in sight when the bulb is mounted in the lamp body.

DESCRIPTION OF THE PREFERRED EMBODIMENT

Figure 1:
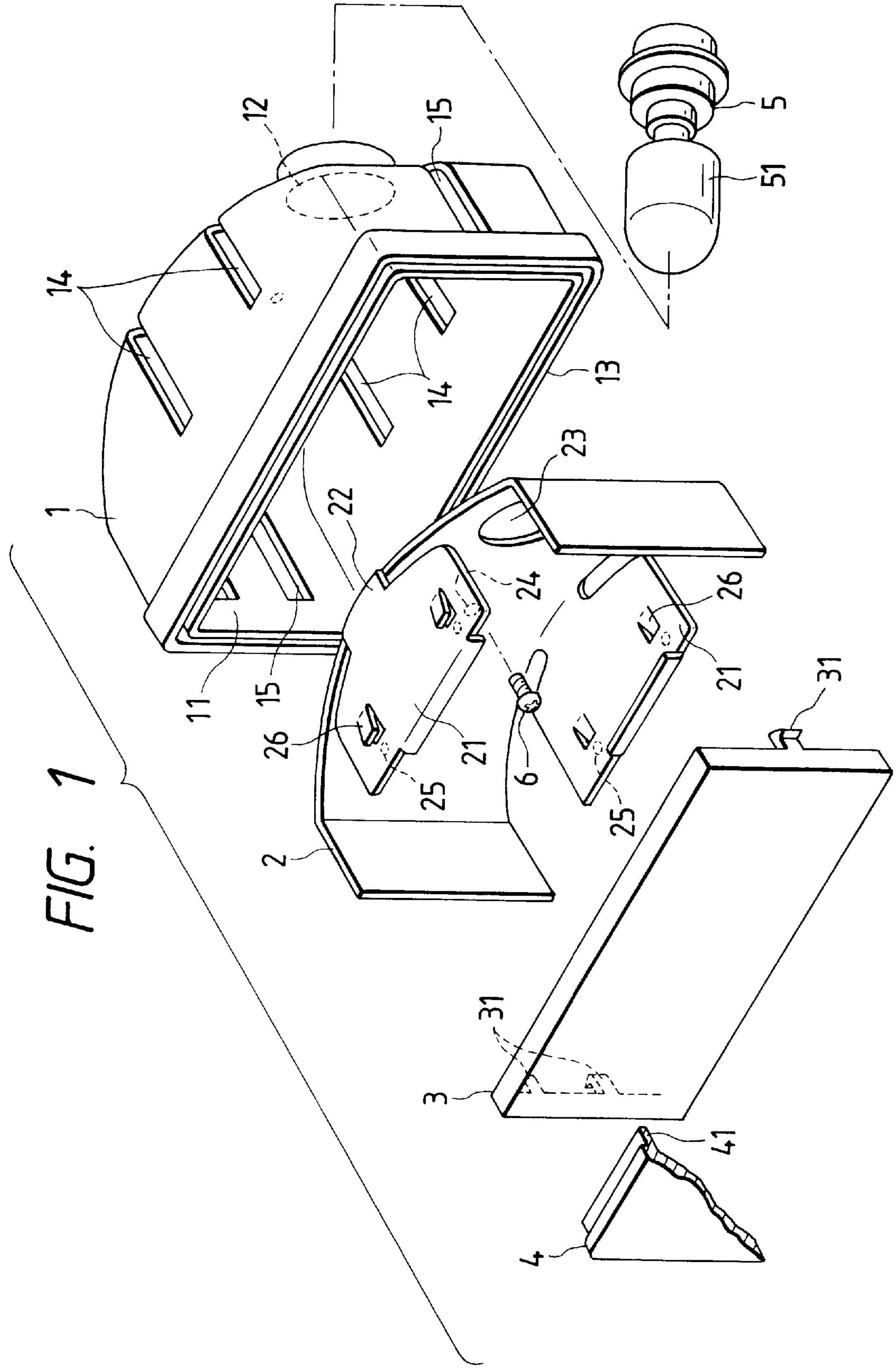
FIG. 1 is a partially exploded perspective view of an automobile backup lamp in this mode for carrying out the invention.
Figure 2:
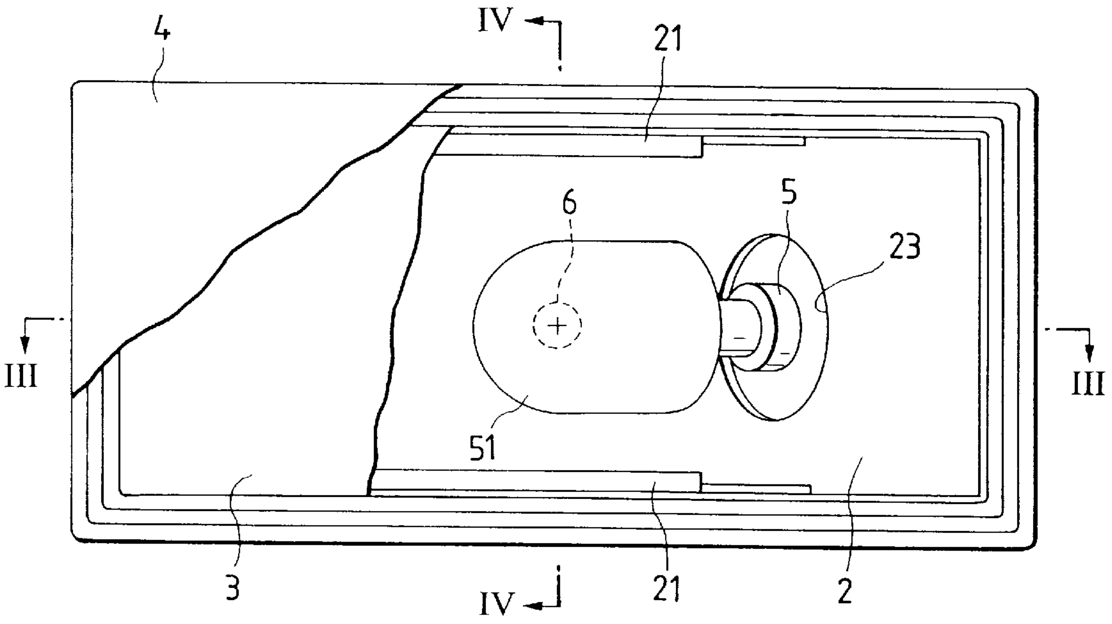
FIG. 2, a partially cutaway elevational view of the backup lamp in assembled condition.
Figure 3:
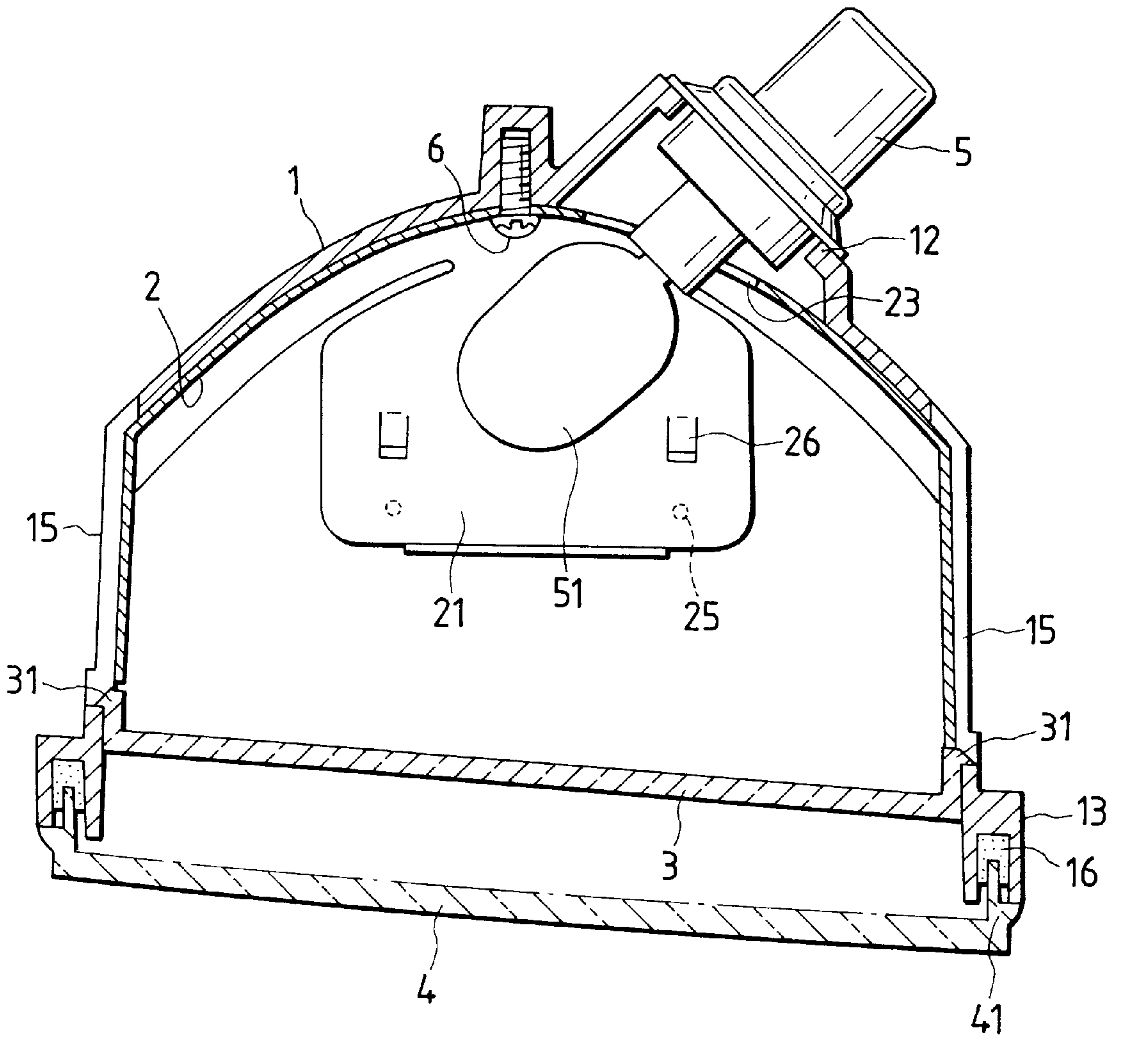
FIGS. 3 and 4, sectional views taken on lines III—III and IV—IV of FIG. 2, respectively.
Figure 4:
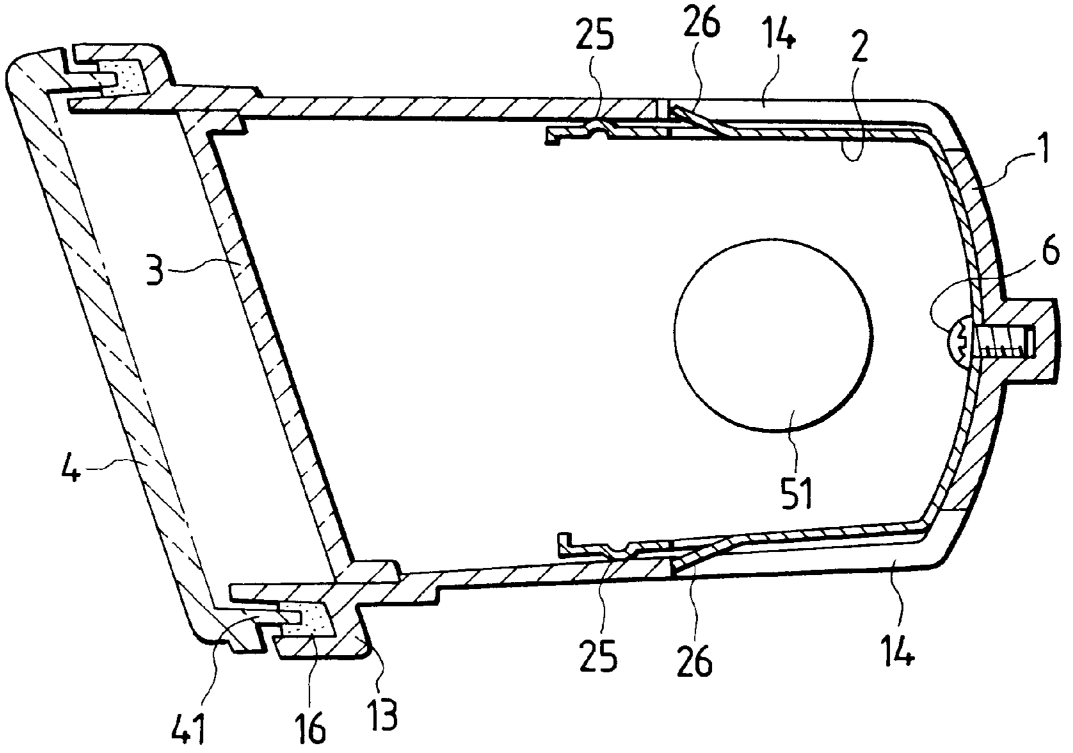

A description will subsequently be given of a mode for carrying out the invention by reference to the drawings. A lamp body 1 is in the form of a flat plastic container having a small vertical dimension and an opening 11 provided on the front side thereof. A bulb mounting hole 12 is bored in the rear wall of the lamp body 1 in a position deviating leftward or rightward from the central portion around the optical axis of the lamp body 1; namely, in a position deviating rightward as viewed from the front side in this case. A sealing groove 13 is formed along the peripheral edge of the front opening 11. Further, upper and lower mating grooves 14 extending backward are cut in two lateral positions of the respective upper and lower planar portions of the lamp body 1, and left and right mating grooves 15 are also cut in the respective left and right curved portions of the lamp body.

On the other hand, a reflector 2 is formed by bending a metal sheet so that it is curved horizontally along the inner face configuration of the lamp body 1. In this mode for carrying out the invention, the reflector 2 is formed integrally with heat shield plates 21 in the form of a flat plate, that is, the heat shield plates 21 have narrow coupling portions 22 coupled to the respective upper and lower edge portions of the reflector 2 and are extended in the upper and lower spaces formed by the reflector 2. Further, a bulb inserting hole 23 is bored in a position slightly deviating leftward from the center of the reflector 1 including its optical axis in such a way as to correspond to the bulb mounting hole 12 bored in the lamp body 1, and a small-diameter screw inserting hole 24 is bored in the central position of the back of the reflector 2. A pair of embosses 25 are protruded outward in positions close to the front edge of each of the upper and lower heat shield plates 21, and tongue-like engaging leaves 26 are formed by partially cut-bending the front-side end portion outward of each heat shield plate 21.

A rectangular inner lens 3 is fitted into the front opening 11 of the lamp body 1 so that an outer lens 4 can be mounted therein from outside. One integral hook-like engaging projection 31 is projected backward from the right side of the inner lens 3 and two of such projections 31 are projected backward from the left side thereof. Moreover, these engaging projections 31 are allowed to engage with the respective front edge portions of the left and right mating grooves 15 provided for the lamp body 1. An integral leg portion 41, which is insertable into a sealing groove 13 provided in the lamp body 1, is projected backward from the peripheral edge of the outer lens 4. Although a diffusion step for refracting the light reflected from the reflector 2 is formed on the inner face of the outer lens 4 in order to obtain light distribution characteristics required for the backup lamp, the description thereof will be omitted.

On the other hand, a bulb socket 5 mountable in the bulb mounting hole 12 bored in the back of the lamp body 1 is provided and used to support a bulb 51 as a light source. The bulb socket 5 is of bayonet structure that has conventionally been employed and as this structure is already well known, the detailed description thereof will be omitted.

When the backup lamp is assembled from the lamp body 1 thus constructed, the reflector 2, the inner lens 3, the outer lens 4 and the bulb 51, the reflector 2 is first mounted inside through the front opening 11 of the lamp body 1. At this time, the reflector 2 is mounted in the lamp body 1 and tightly clamped thereto by utilizing a screw 6 inserted into the screw inserting hole 24 provided in the central position of the back of the lamp body 1. When the reflector 2 is thus fixed, the upper and lower heat shield plates 21 are mounted along the respective inner faces of the upper and lower planar portions of the lamp body 1 while undergoing slight elastic deformation inward. When the reflector 2 is fixed in a predetermined position, the engaging leaves 26 provided for the heat shield plates 21 are caused to engage with the respective upper and lower mating grooves 14 of the lamp body 1. Then the engaged condition due to the engaging leaves 25 is maintained because the embosses 25 provided for the heat shield plates 21 are respectively brought into contact with the inner faces of the upper and lower planar portions of the lamp body 1 with the effect of causing elastic drag to each of the heat shield plates 21.

The inner lens 3 is similarly mounted from the front side through the front opening 11 of the lamp body 1. At this time, the engaging projections 31 formed on the left and right sides of the inner lens 3 are caused to engage with the respective front edge portions of the left and right mating grooves 15 of the lamp body 1, whereby the inner lens 3 is held to the lamp body 1. Since the inner face of the inner lens 3 is simultaneously brought into contact with the front end portion of the left and right sides of the reflector 2, moreover, the aforesaid tightly held condition of the reflector 2 is further ensured. Therefore, the reflector 2 is held tightly to the interior of the lamp body 1 in stable condition and prevented from slipping off. Further, the outer lens 4 is mounted from the outside in such a way as to cover the front opening 11. Then the leg portion 41 provided on the peripheral edge of the outer lens 4 is fitted into the sealing groove 13 of the lamp body 1, and the joint therebetween is fixedly sealed with a sealing compound for use in filling up the sealing groove 13, whereby the outer lens 3 is integrally secured to the lamp body 1.

Then the bulb socket 5 is mounted in the bulb mounting hole 12 from the back of the lamp body 1. When the bulb 51 thus mounted is disposed in the reflector 2 through the bulb inserting hole 23 of the reflector 2, the bulb 51 is inserted into the reflector 2 from the left side with respect to the center of the reflector 2 since the bulb inserting hole 23 is deviated leftward with respect to the center of the reflector 2, and its filament is mounted so that it is positioned at the focal point of the reflector. Consequently, the screw 6 used to tightly hold the reflector 2 to the lamp body 1 is hidden by the bulb 51 when the lamp is looked at from the front and set from exposure to the front side of the lamp.

Since the bulb inserting hole 23 provided in the reflector 2 of this backup lamp is bored in the position deviating from the center thereof, the reflector 2 can thus be fixedly supported in the central portion of the reflector 2 in a well-balanced fashion in both horizontal and vertical directions by means of one screw 6. In consequence, any reduction in the effective reflective surface area of the reflector 2 is suppressed with the effect of increasing the reflective efficiency of the light emitted from the bulb 51, and the lamp assembly workability is made improvable by reducing the number of steps required when the screw 6 is tightened. Further, the screw 6 used to fixedly support the reflector 2 is hidden by the bulb 51 normally during the time the bulb 51 has been mounted, whereby the screw 6 is set free from exposure to the front side of the lamp with the effect of preventing the neatness of the external appearance of the lamp from being deteriorated.

The heat shield plates 21 and the reflector 2 are integrally formed and when the reflector 2 is held tightly to the interior of the lamp body 1, the heat shield plates 21 are also held tightly to the lamp body 1 as the engaging leaves 26 provided on the heat shield plates 21 are caused to engage with the respective vertical mating grooves 14 of the lamp body 1. Thus, no special work of fixedly holding the heat shield plates is necessary and this makes it possible to not only decrease the number of parts but also improve the lamp assembly workability. Since the engaged condition of the engaging leaves 26 of the heat shield plates 21 and the respective upper and lower mating grooves 14 is held by the elastic drag derived from the embosses 25, the heat shield plates 21 is effectively prevented from slipping off the lamp body 1 because of automotive vibration during its traveling.

Although a description has been given of the invention applied to the backup lamp of an automobile by way of example in the aforesaid mode for carrying out the invention, the present invention is applicable to any lamp as well on condition that the lamp is so constructed as to hold a reflector together with heat shield plates as a separate body to the interior of a lamp body. Since the reflector according to the present invention is arranged so that it is held tightly to the lamp body itself, moreover, the present invention is also applicable to a lamp without the presence of the inner lens in the aforesaid mode for carrying out the invention.

As set forth above, according to the present invention, the bulb inserting hole is provided in the position deviating from the center of the reflector and by the fixing means, the reflector is held in its central portion tightly to the lamp body. Consequently, the reflector can be held tightly by one fixing means in an well-balanced fashion with the effect of not only improving the light reflective efficiency of the lamp by decreasing the area required for the provision of the fixing means but also simplifying the work of fixing the reflector. Since the fixing means is hidden by the bulb and set free from exposure to the front side, improvement in the neatness of the external appearance of the lamp is effected. Further, the heat shield plates and the reflector are integrally formed and each of the heat shield plates is provided with the engaging means for holding itself tightly to the lamp body, whereby the work of fixing the heat shield plates can be simplified.

What is claimed is:

1. A vehicle lamp, comprising:

a lamp body having a front opening and a bulb mounting hole disposed in a back thereof;

an outer lens fitted into the front opening of said lamp body to define a lamp chamber;

a reflector formed separately from said lamp body and located within said lamp chamber, said reflector having a bulb inserting hole disposed corresponding to said bulb mounting hole of said lamp body, said lamp body and said reflector being configured such that said bulb mounting hole and said bulb inserting hole are deviated from an optical axis of the reflector defined through the center of said reflector; and a bulb fitted into the lamp body from behind through said bulb mounting hole of said lamp body and through said bulb inserting hole of said reflector, an axis of said bulb being diagonal with respect to the optical axis of the reflector such that a portion of the bulb is disposed on the optical axis of the reflector.

2. The vehicle lamp according to claim 1, wherein said reflector is formed integrally with heat shield plates for respectively covering areas above and below said bulb.

3. The vehicle lamp according to claim 2, wherein each of said heat shield plates is provided with an engaging means for engaging with said lamp body.

4. The vehicle lamp according to claim 3, wherein each of said engaging means comprises:

engaging leaves formed by partially cut-raising a respective one of said heat shield plates, and mating grooves provided in each of the upper and lower face portions of said lamp body, said vehicle lamp being configured such that elastic deformation of said engaging leaves causes said engaging leaves to engage with said mating grooves when said reflector and said heat shield plates are fitted into said lamp body.

5. The vehicle lamp according to claim 1, wherein said lamp body is in the form of a flat plastic container having a smaller vertical dimension than horizontal dimension.

6. The vehicle lamp according to claim 5, wherein said bulb mounting hole and said bulb inserting hole are formed in a position horizontally deviated from the central portion of said reflector.

7. The vehicle lamp according to claim 6, wherein said bulb mounting hole and said bulb inserting hole are formed in a position deviating rightward as viewed from the front side of the lamp.

8. The vehicle lamp according to claim 2, wherein said reflector and said heat shield plates are formed by bending a metal plate.

9. The vehicle lamp according to claim 1, wherein said reflector is secured to said lamp body by at least one screw positioned directly rearward with respect to said bulb.

10. The vehicle lamp according to claim 1, further comprising an inner lens disposed within said lamp chamber and inside of said outer lens.

11. The vehicle lamp according to claim 1, wherein said bulb has a filament positioned at a focal point of said reflector.

12. The vehicle lamp according to claim 9, wherein said screw is inserted into a screw inserting hole formed in the central position of the back of said lamp body.

13. A vehicle lamp, comprising:

a lamp body having a front opening and a bulb mounting hole disposed in a back thereof;

an outer lens fitted into the front opening of said lamp body to define a lamp chamber;

a reflector formed separately from said lamp body and located within said lamp chamber, said reflector having a bulb inserting hole disposed corresponding to said bulb mounting hole of said lamp body, said bulb inserting hole being deviated from the center of said reflector;

a bulb fitted into the lamp body from behind through said bulb mounting hole of said lamp body and through said bulb inserting hole of said reflector; and heat shield plates formed integrally with said reflector by bending a metal plate such that said heat shield plates respectively cover areas above and below said bulb.

14. A vehicle lamp, comprising:

a lamp body having a front opening and a bulb mounting hole disposed in a back thereof;

an outer lens fitted into the front opening of said lamp body to define a lamp chamber;

a reflector formed separately from said lamp body and located within said lamp chamber, said reflector having a bulb inserting hole disposed corresponding to said bulb mounting hole of said lamp body, said bulb inserting hole being deviated from the center of said reflector;

a bulb fitted into the lamp body from behind through said bulb mounting hole of said lamp body and through said bulb inserting hole of said reflector; and a securing member positioned directly rearward with respect to said bulb to secure said reflector to said lamp body.

* * * * *